(12) United States Patent
Chen

(10) Patent No.: US 6,452,792 B1
(45) Date of Patent: Sep. 17, 2002

(54) COMPUTER ENCLOSURE INCORPORATING DRIVE BRACKET

(75) Inventor: Chia-Hua Chen, Tu-Chen (TW)

(73) Assignee: Hon Hai Precision Ind. Co., Ltd., Taiepi Hsien (TW)

( * ) Notice: Subject to any disclaimer, the term of this patent is extended or adjusted under 35 U.S.C. 154(b) by 0 days.

(21) Appl. No.: 09/677,849

(22) Filed: Oct. 3, 2000

(30) Foreign Application Priority Data

May 9, 2000 (TW) ........................................ 089207741

(51) Int. Cl.⁷ ................................................ G06F 1/16
(52) U.S. Cl. ..................... 361/685; 361/679; 361/683; 361/684; 361/686; 361/312; 361/223.1; 361/223.2
(58) Field of Search .................... 361/679, 683–686; 312/223.1, 223.2

(56) References Cited

U.S. PATENT DOCUMENTS 5,564,804 A * 10/1996 Gonzalez et al. ........ 312/223.2
5,768,099 A * 6/1998 Radloff et al. ............... 361/685
5,921,644 A * 7/1999 Brunel et al. ............. 312/223.2

* cited by examiner

Primary Examiner—Darren Schuberg
Assistant Examiner—Yean H Chang
(74) Attorney, Agent, or Firm—Wei Te Chung

(57) ABSTRACT

A drive bracket (10) includes a support base (20), a side plate (30) extending from one edge of the support base, and a retaining plate (40) extending from one edge of the side plate to be opposite to the support base. The support base has a flange (27) extending from another side thereof, a pair of spring tabs (24), recesses (22) each including an opening (23), and a pair of through holes (28) opposite to the spring tabs. The side plate has a pair of posts (32) formed inwardly at opposite ends thereof. The retaining plate has four spring fingers (42) extending inwardly. A hard disk drive engages with the drive bracket and the drive bracket is then engaged to a base panel within a computer enclosure.

14 Claims, 5 Drawing Sheets

COMPUTER ENCLOSURE INCORPORATING DRIVE BRACKET

BACKGROUND

1. Field of the Invention

The present invention relates to a computer enclosure, and particularly to a computer enclosure incorporating a drive bracket.

2. The Related Art

The trend toward miniaturization in the computer industry requires fully exploiting the internal space of a computer. Components in the computer are compactly arranged in a limited space inside the computer enclosure. Computer enclosures are also required to be designed for readily receiving electronic components therein. Typically, a hard disk drive is first fixed to a drive bracket via screws, and then the drive bracket with the hard disk drive therein is attached to the computer enclosure via screws.

However, when the drive bracket with the hard disk drive therein is attached to the computer enclosure via screws, the hard disk drive must firstbe held in the correct position by hand. This is unduly inconvenient. Furthermore, using screws to fix the hard disk drive to the drive bracket andto attach the drive bracket to a computer enclosure is unduly complicated and time-consuming.

SUMMARY OF THE INVENTION

Accordingly, an object of the present invention is to provide a computer enclosure incorporating a drive bracket for readily attaching a hard disk drive to the computer enclosure.

To achieve the above-mentioned object, a drive bracket in accordance with the present invention includes a support base, a side plate extending perpendicularly from one side edge of the support base, and a retaining plate extending from an upper edge of the side plate and arranged to be opposite the support base. The support base has a guiding flange extendingfrom another side edge thereof adjacent the side edge attached to the side plate, recesses each defining an opening, a pair of spring tabs, and a pair of through holes opposite to the spring tabs. The side plate has a pair of posts formed inwardly at opposite ends thereof. The retaining plate has four spring fingers stamped inwardly.

Other objects, advantages and novel features of the present invention will be drawn from the following detailed embodiment of the pesent invention with attached drawings, in which:

DESCRIPTION OF THE PREFERRED EMBODIMENT

Figure 1:
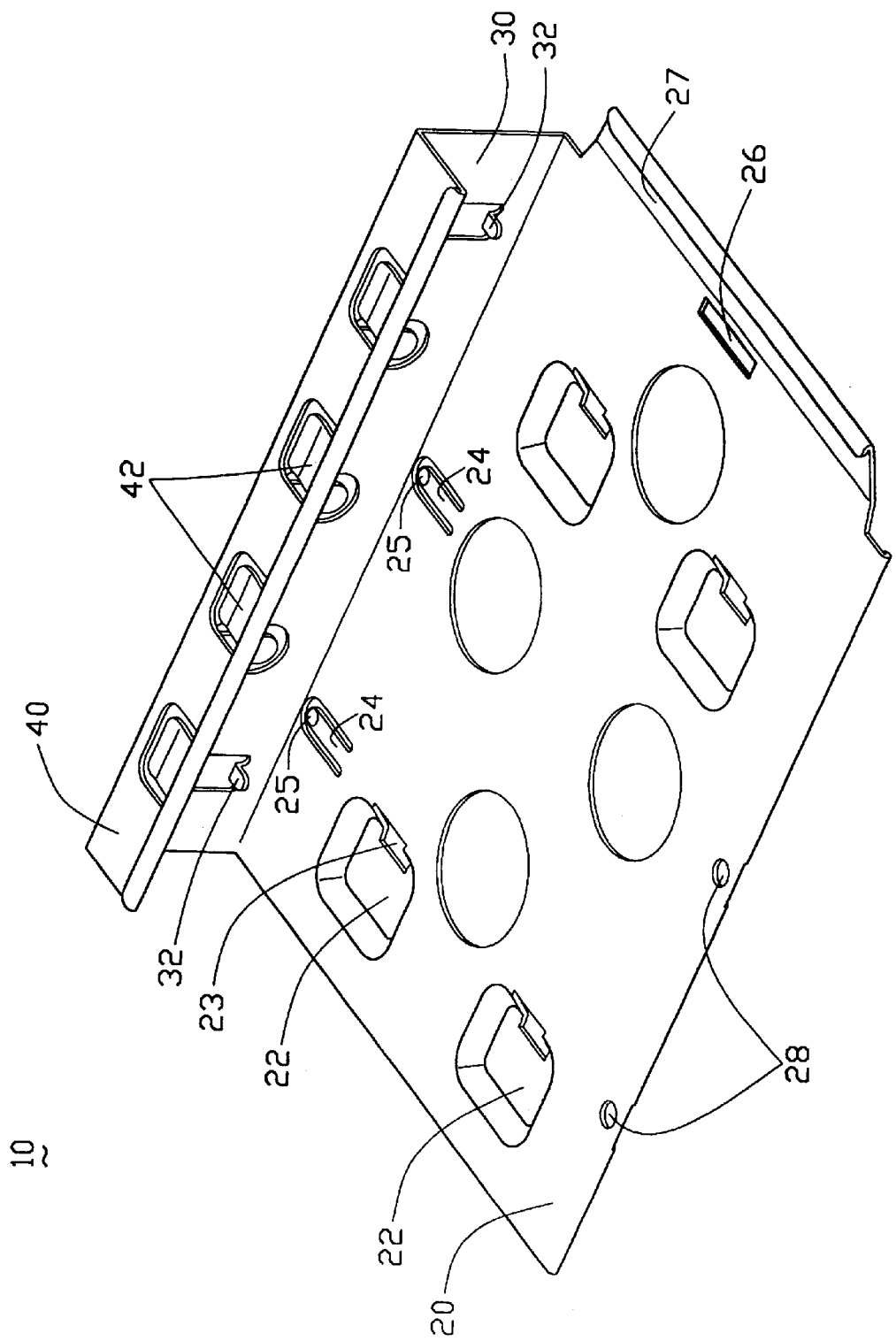
FIG. 1 is a perspective view of a drive bracket of the present invention.
Figure 2:
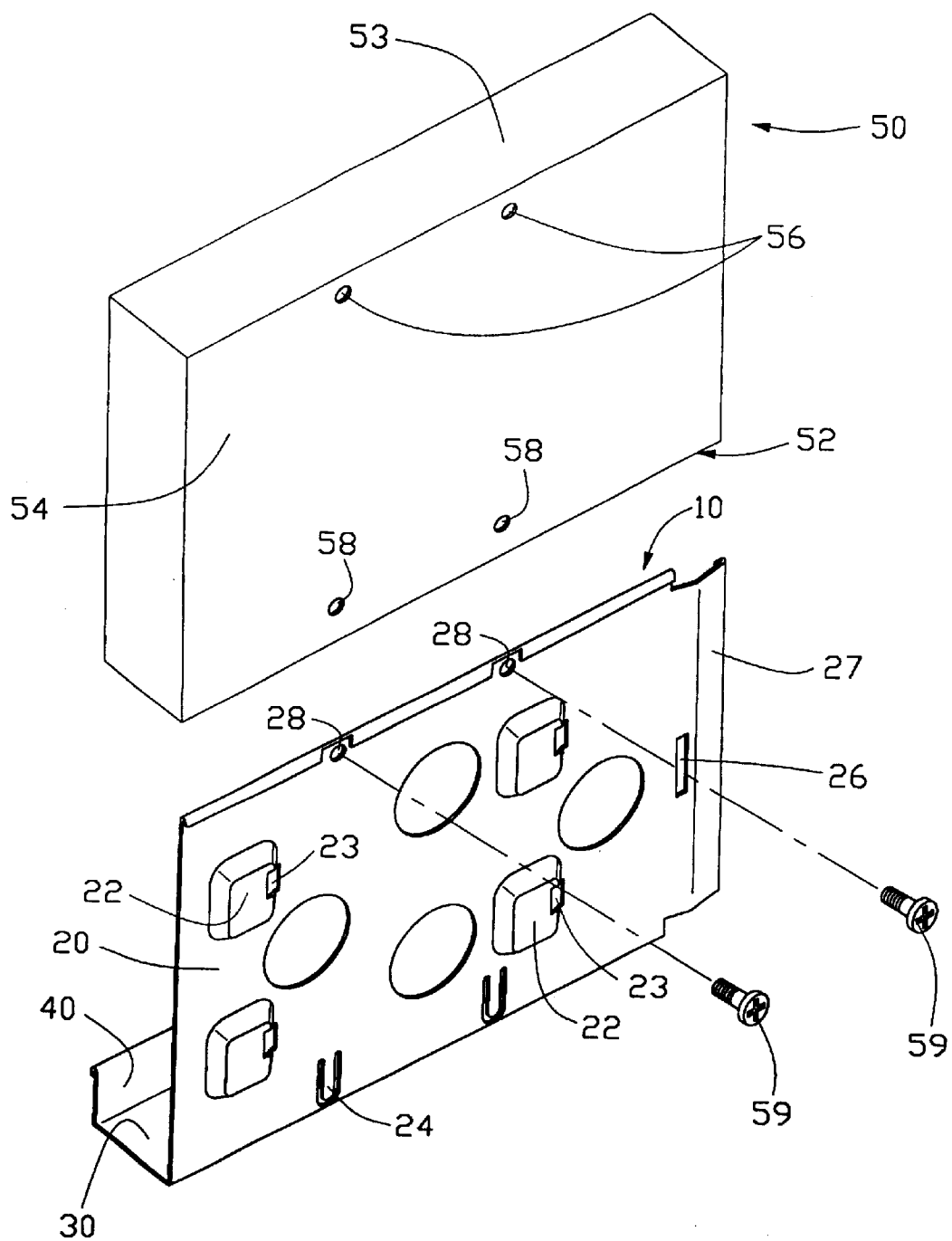
FIG. 2 is an exploded view showing a hard disk drive to be attached to the drive bracket of FIG. 1 to form a drive bracket assembly.

Referring to FIGS. 1 and 2, a drive bracket 10 of the present invention for accommodating and supporting a hard disk drive 50 has a support base 20, a side plate 30 and a retaining plate 40 together defining a space (not labeled) for receiving the hard disk drive 50. The side plate 30 extends perpendicularly from one side edge of the support base 20. The retaining plate 40 extends perpendicularly from an upper edge of the side plate 30, and is arranged to be opposite the support base 20.

The hard disk drive 50 comprises a first side wall 52, a second side wall 53 and a bottom wall 54. The first side wall 52 defines a pair of locking holes (not shown). The bottom wall 54 defines a pair of fixing holes 58 near the first side wall 52, and a pair of screw holes 56 near the second side wall 53.

The support base 20 defines a pair of through holes 28 near the edge opposite the side edge from which the side plate 30 extends, for extension of bolts 59 therethrough. The bolts 59 threadedly engage with the screw holes 56 of the hard disk drive 50. A pair of spring tabs 24 is formed in the support base 20 opposite to the through holes 28. Each spring tab 24 forms a protrusion 25 at a free end thereof, for engaging with the hard disk drive 50. Four recesses 22 with openings 23 for engaging with a computer enclosure 60 as will be described later, are formed in the support base 20. A guiding flange 27 is formed from an edge of the support base 20 perpendicular to the side edge from which the side plate 30 extends, for engaging with the computer enclosure. A slot 26 is defined in the support base 20 parallel to and near the guiding flange 27.

A pair of posts 32 is inwardly formed near opposite ends of the side plate 30, for engagement with the locking holes (not shown) of the hard disk drive 50. The retaining plate 40 has four spring fingers 42 stamped inwardly, for resiliently engaging the hard disk drive 50.

In mounting the hard disk drive 50 to the drive bracket 10, the posts 32 of the drive bracket 10 are engaged with the locking holes(not shown) in the first side wall 52 of the hard disk drive 50. The protrusions 25 of the support base 20 engage with the fixing holes 58 in the bottom wall 54 of thehard disk drive 50. The bolts 59 extend through the through holes 28 of the support base 20 and engage with the screw holes 56 of the hard disk drive 50. The spring fingers 42 of the retaining plate 40 resiliently engage the hard disk drive 50. Thus, the hard disk drive 50 is firmly engaged with the drive bracket 10 to form a drive bracket assembly (not labelled).

Figure 3:
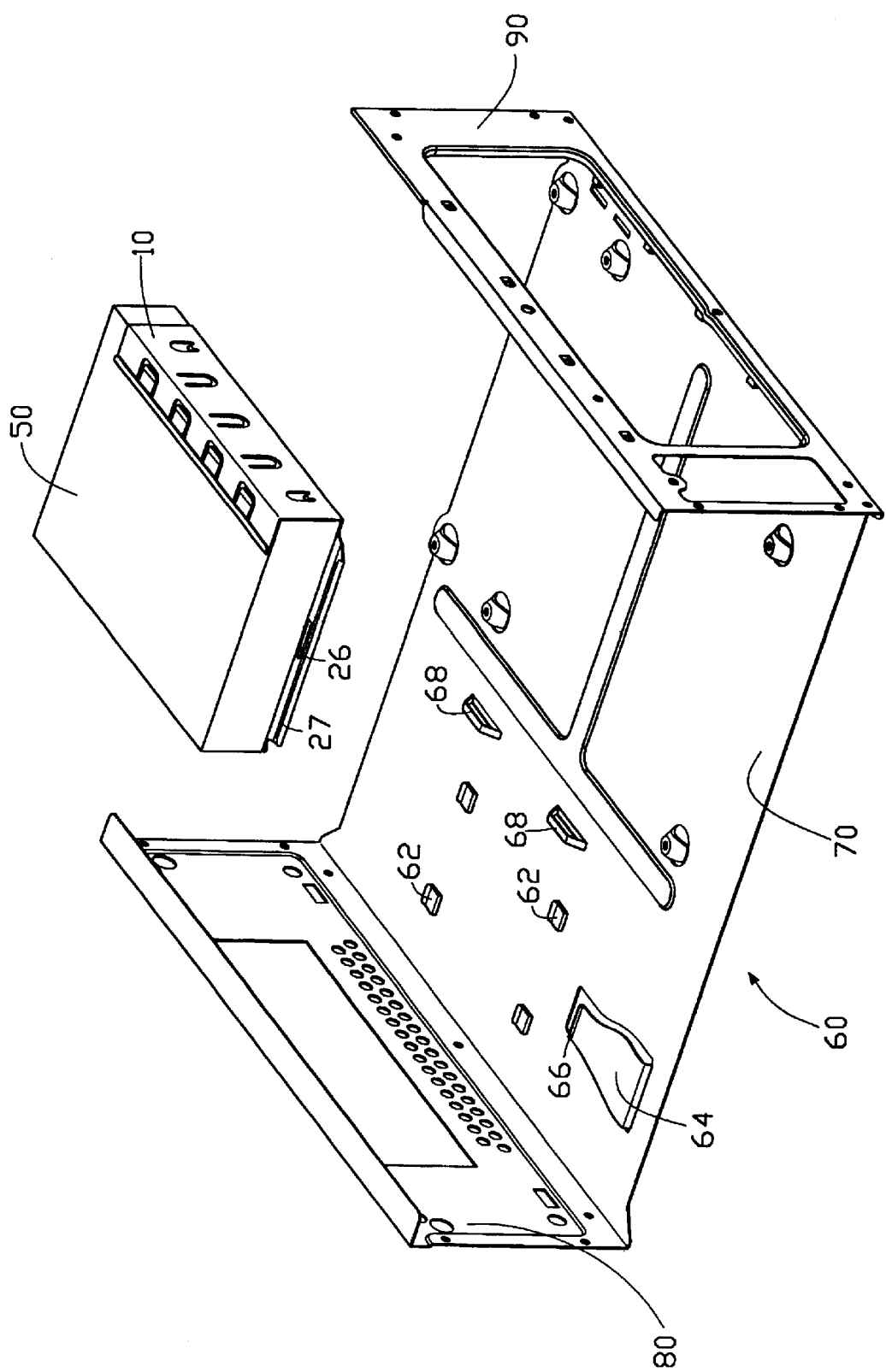
FIG. 3 is an exploded view showing the complete drive bracket assembly of FIG. 2 to be received in a computer enclosure.

Referring to FIG. 3, a housing 60 of a computer enclosure to which the drive bracket 10 is to be mounted has a base panel 70, a front panel 80 and a rear panel 90. The base panel 70 of the housing 60 has four retaining hooks 62 for engagement with the openings 23 of the drive bracket 10, and also has an elastically deformable latch 64 with a claw 66 for engagement with the slot 26 of the drive bracket 10. A pair of extrusions 68 is formed inwardly from the base panel 70, aligned parallel to the front panel 80. The extrusions 68 together with the front panel 80 define a passageway (not labeled) for guiding the drive bracket 10 into the housing 60 in assembly.

Figure 4:
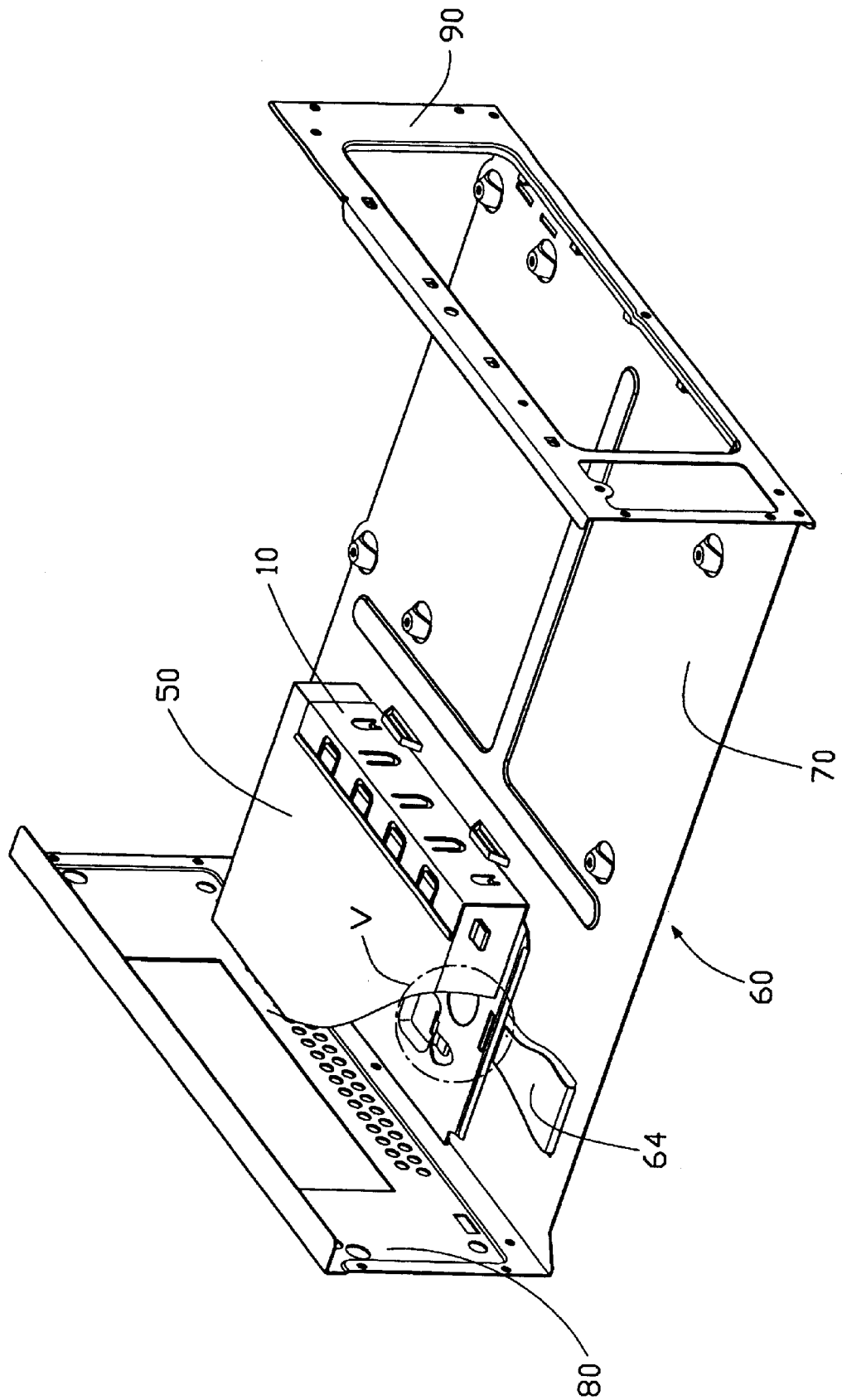
FIG. 4 is an assembled view of FIG. 3, with a portion of the drivebracket assembly cut away.
Figure 5:
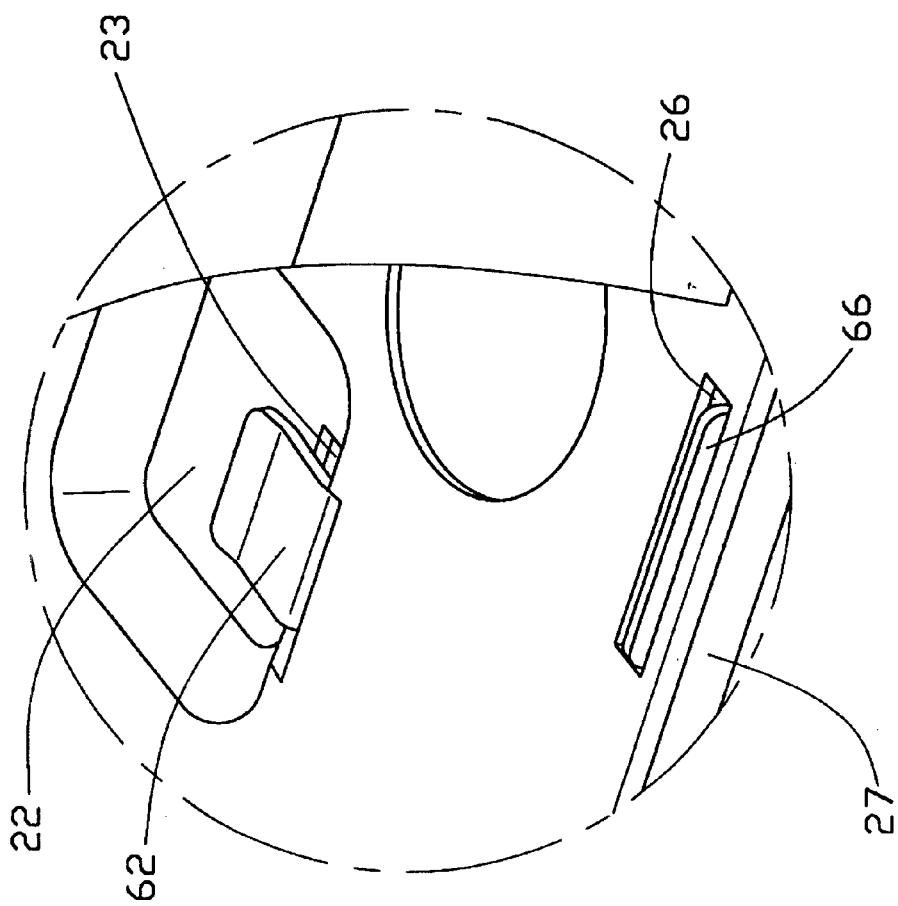
FIG. 5 is an enlarged view of the encircled portion V of FIG. 4.

Referring to FIGS. 3–5, to assemble the drive bracket 10 with thehard disk drive 50 mounted thereon to the housing 60, the drive bracket 10 is guided into the housing 60 by the extrusions 68 and the front panel 80 of the housing 60. In the assembled position, the extrusions 68 abut against the side plate 30 of the drive bracket 10, thereby preventing the drive bracket 10 from moving in a first direction perpendicular to the front panel 80. The retaining hooks 62 extend through the openings 23 and engage with the recesses 22. The flange 27 snaps over the latch 64 and the claw 66 of the latch 64snaps into the slot 26 of the drive bracket 10. The retaining hooks 62 in engagement with the recesses 22 and the claw 66 in engagement with the slot 26 (as shown in FIG. 5) all cooperate to prevent the drive bracket 10 from moving in a second direction parallel to the base panel 70 and perpendicular to the first direction. The retaining hooks 62 prevent the drive bracket 10 from moving in a direction normal to the base panel 70. Thus, the drive bracket 10 is firmly secured to the housing 60.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A drive bracket for mounting a disk drive to a computer housing, the housing having a latch and a retaining hook, the drive bracket comprising:

a support base having at least one through hole for extension of a bolt therethrough for threadedly engaging with a disk drive received in the drive bracket, and a slot for engaging with the latch;

a side plate extending from one side of the support base;

a retaining plate extending from the side plate opposite to the support base and having at least one spring finger for resiliently engaging the disk drive; and a guiding flange extending upwardly and outwardly from an edge of the support base perpendicular to said one side of the support base from which the side plate extends, for snapping over the latch and guiding the latch to engage in the slot.

2. The drive bracket as described in claim 1, wherein at least a spring tab is formed in the support base generally opposite to the at least one through hole.

3. The drive bracket as described in claim 2, wherein each spring tab forms a protrusion at a free end thereof for engaging with the disk drive.

4. The drive bracket as described in claim 1, wherein the side plate comprises at least a post for engaging with a side wall of the disk drive.

5. The drive bracket as described in claim 1, wherein the support base comprises at least two through holes corresponding to at least two screw holes defined in a bottom wall of the disk drive.

6. A computer enclosure comprising:

a housing comprising a base panel and a front panel perpendicular to the base panel, the base panel having at least a latch and at least a retaining hook; and a drive bracket attached to the housing and adapted to receive a disk drive; the drive bracket comprising a support base defining at least a slot engaging with the at least a latch, at least a recess, and at least an opening in communication with the recess and engaging with the at least a retaining hook of the housing; wherein the at least a latch in engagement with the at least a slot and the at least a retaining hook in engagement with the at least an opening cooperate to prevent the drive bracket from moving in a direction parallel to the base panel and the front panel, and the at least a retaining hook in engagement with the at least an opening prevents the drive bracket from moving in a direction perpendicular to the base panel.

7. The computer enclosure as described in claim 6, wherein the base panel of the housing comprises two extrusions aligned in one line forming a passageway with the front panel to guide the drive bracket into the housing, and the extrusions and the front panel sandwich the drive bracket to thereby prevent the drive bracket from moving in a direction perpendicular to the front panel.

8. The computer enclosure as described in claim 6, wherein the drive bracket further comprises a side plate extending from the support base.

9. The computer enclosure as described in claim 8, wherein the support base comprises at least one through hole adapted for extension of at least a bolt therethrough to threadedly engage with the disk drive.

10. The computer enclosure as described in claim 8, wherein the side plate comprises at least a post adapted to engage with a side wall of the disk drive.

11. The computer enclosure as described in claim 8, wherein a retaining plate further extends from the side plate of the drive bracket and formsat least a spring finger.

12. The computer enclosure as described in claim 6, wherein at least a guiding flange extends upwardly and outwardly from an edge of the drive bracket for guiding the latch to engage with the slot.

13. A computer enclosure assembly comprising:

a housing comprising a base panel and a front panel, the base panel having at least a latch, at least a protrusion and at least a retaining hook;

a drive bracket defining at least a slot and at least a recess with an opening in communication with said recess; and a hard disk drive attachably positioned on the drive bracket; wherein the drive bracket is attached to the housing and generally sandwiched between said housing and said hard disk drive under a condition that the latch is latchably received within the slot, and that the retaining hook penetrates the opening and is retained in the recess under the hard disk drive, thereby positioning the drive bracket in the housing and preventing the drive bracket from moving in a direction parallel to an edge at which the base panel intersects the front panel, the at least a protrusion and the front panel positioning the drive bracket in the housing and preventing the drive bracket from moving in a direction perpendicular to the front panel.

14. The computer enclosure as described in claim 13, wherein the drive bracket comprises a support base supporting the hard disk drive thereon, a side plate extending from one side of the support base and having a post engaging in a locking hole of the hard disk drive, a retaining plate extending from the side plate sandwiching the hard disk drive with the support base, and a guiding flange extending upwardly and outwardly from an edge of the support base perpendicular to said one side of the support base from which the side plate extends, for snapping over the latch and guiding the latch to engage in the slot.

* * * * *